United States Patent [19]

Imai et al.

[11] Patent Number: 4,639,494

[45] Date of Patent: Jan. 27, 1987

[54] PROCESS FOR PRODUCING POLYSTYRENE

[75] Inventors: Akio Imai, Ichihara; Yasushi Okamoto, Ibaraki; Masatoshi Saito, Ichihara, all of Japan

[73] Assignee: Sumitomo Chemical Company, Limited, Osaka, Japan

[21] Appl. No.: 704,856

[22] Filed: Feb. 25, 1985

[30] Foreign Application Priority Data

Feb. 28, 1984 [JP] Japan ................................. 59-37490

[51] Int. Cl.$^4$ ......................... C08F 4/08; C08F 279/00
[52] U.S. Cl. .................................. 525/271; 525/267; 525/272; 525/316
[58] Field of Search ......................... 525/272, 271, 316

[56] References Cited

FOREIGN PATENT DOCUMENTS 0046668  3/1982  European Pat. Off. ............ 525/271
44188   11/1978  Japan.
4934     1/1983  Japan.

Primary Examiner—Wilbert J. Briggs, Sr.

Attorney, Agent, or Firm—Stevens, Davis, Miller & Mosher

[57] ABSTRACT

In a process for producing a high impact polystyrene comprising the radical polymerization of styrene in the presence of a butadiene rubber, the improvement which comprises, the butadiene rubber being a highly branched polymer prepared by homopolymerizing 1,3-butadiene or copolymerizing 1,3-butadiene and styrene in the presence of an organolithium compound and a Lewis base compound, followed by further reacting the resulting polymer with a multifunctional halogen compound; in the butadiene rubber, the average content of 1,2-bonds being 18 to 32 mole % based on the total bonded butadiene, the content of bonded styrene being up to 10% by weight, and the content of branched polymer chains being at least 60% by weight; the butadiene rubber exhibiting a Mooney viscosity of 40 to 90 at 100° C. and a solution viscosity in styrene of 60 to 90 cps at 25° C. and at a concentration of 5% by weight; and the styrene polymerization being carried out so that the content of the butadiene rubber in the product polystyrene lies between 3 and 20% by weight.

13 Claims, No Drawings

PROCESS FOR PRODUCING POLYSTYRENE

BACKGROUND OF THE INVENTION

1. Field of the Invention

The present invention relates to a process for producing high impact polystyrene (hereinafter referred to as HIPS).

2. Description of the Prior Art

In recent years large amounts of various synthetic resins are used in vehicles such as automobiles and in many other fields. However, there are strong requests for improvements of these resins in mechanical properties as well as appearance properties including surface gloss. Specially in the case of HIPS, it is requested to improve impact resistance and visual appeal such as surface gloss at the same time.

To improve the impact resistance of polystyrene, a method of graft polymerizing styrene or a mixture of styrene and another monomer copolymerizable therewith on a butadiene rubber has been developed and is generally practiced in the industry.

In this case, however, the use of a high cis content polybutadiene (so-called high Cis-BR) commercially avilable in usual has posed problems such that not only the impact strength improving effect is insufficient but also a coloration of the HIPS occasionally takes place or the impact strength is rather lowered by the incident formation of gel particles. On the other hand, the use of a commercial polybutadiene of relatively high trans content (so-called low Cis-BR), produced in the presence of a lithium-based polymerization initiator, results in a HIPS of relatively low gel content and fairly improved impact strength. But also in this case, it is necessary for further improving the impact strength to increase the amount of the polybutadiene used or raise the average molecular weight of the polybutadiene. This makes worse the gloss of the HIPS and lowers the surface smoothness thereof. Thus simultaneous improvements of the impact strength and the visual appeal have not been accomplished in any case.

SUMMARY OF THE INVENTION

In view of such situation, the present inventors made intensive studies for producing a polystyrene improved in impact resistance as well as in appearance properties. As a result, it has been found that a HIPS having the intended performance characteristics can be obtained by using a butadiene polymer of specific structure as the backbone rubber for styrene graft polymerization. Thus the invention has been accomplished.

Objects of the invention are to provide a polystyrene having high impact resistance and being simultaneously superior in appearance properties such as surface gloss and surface smoothness and to provide a process for producing such a polystyrene.

According to the present invention, there is provided a process for producing a high impact polystyrene comprising the radical polymerization of styrene in the presence of a butadiene rubber, in which the improvement which comprises the butadiene rubber being a highly branched polymer prepared by homopolymerizing 1,3-butadiene or copolymerizing 1,3-butadiene with styrene in the presence of an organolithium compound and a Lewis base compound, followed by further reacting the resulting polymer with a multifunctional halogen compound; in the butadiene rubber, the average content of 1,2-bond being 18 to 32 mole % based on the total bonded butadiene, the content of bonded styrene being up to 10% by weight, and the content of branched polymer chains being at least 60% by weight; the butadiene rubber exhibiting a Mooney viscosity of 40 to 90 at 100° C. and a solution viscosity in styrene of 60 to 90 cps at 25° C. and at a concentration of 5% by weight; and the styrene polymerization being carried out so that the content of the butadiene rubber in the product polystyrene lies between 3 and 20% by weight.

DETAILED DESCRIPTION OF THE INVENTION

The butadiene rubber used in the present invention is a polymer having branched polymer chains which is obtained by homopolymerizing 1,3-butadiene or copolymerizing 1,3-butadiene with styrene in the presence of an organolithium compound (polymerization initiator) and a Lewis base compound, and further reacting the resulting homopolymer or copolymer with a multifunctional halogen compound to react with active chain ends thereof.

Suitable organolithium compounds for use herein as the polymerization initiator include, for example, alkyl-lithiums such as ethyllithium, n-butyllithium, n-hexyllithium, and stearyllithium, and further allyllithium, cyclohexyllithium, phenyllithium, benzyllithium, tetramethylenedilithium, diphenylethylenedilithium, 1,20-dilithioeicosane, and 1,4-dilithiocyclohexane. In particular, alkyllithiums are preferred. Such an organolithium compound is used generally in an amount of 0.5 to 3 mmole per 100 g of 1,3-butadiene, or a mixture of 1,3-butadiene and styrene.

Suitable Lewis base compounds for use herein include, for example, ethers such as dibutyl ether, tetrahydrofuran, ethylene glycol dimethyl ether, ethylene glycol dibutyl ether, diethylene glycol dimethyl ether, and diethylene glycol dibutyl ether, and tertiary amines such as triethylamine, tributylamine, and N,N,N',N'-tetramethylethylenediamine. These compounds may be used alone or in combination. Optimum amounts of the compound used depend on the species thereof and hence cannot always be specified. Generally speaking, however, the amounts are 0.01 to 1.00 mole per mole of the organolithium compound. In the case of diethylene glycol dimethyl ether, which is a typical Lewis base usable herein, the amounts are 0.05 to 0.15 mole per mole of the organolithium compound.

The base constituent 1,3-butadiene is used preferably in the single state, though used in combination with styrene depending on circumstances. In the combined use, desirable amounts of styrene are in such a range that the content of bonded styrene in the resulting butadiene copolymer is up to 10%, preferably up to 7%, by weight, in view of the surface gloss and the like of the resulting HIPS product. The polymerization of 1,3-butadiene or copolymerization of 1,3-butadiene with styrene is conducted at 30° to 80° C. for 1 to 6 hours.

The butadiene rubber having branched polymer chains can be obtained by the successive reaction of a multifunctional halogen compound with the 1,3-butadiene polymer or copolymer resulting from the homopolymerization or copolymerization in the presence of the above-mentioned organolithium compound and Lewis base compound. The above-mentioned reaction can be carried out at 30° to 80° C. for 5 minutes to 1 hour.

Suitable multifunctional halogen compounds for use herein are dimethylsilicon dichloride, monomethylsilicone trichloride, silicon tetrachloride, tin tetrachloride, germanium tetrachloride, etc. These compounds may be used alone or in combination of two or more.

In the thus prepared butadiene rubber, the average content of 1,2-bonds is to be in the range of from 18 to 32 mole %, preferably from 20 to 30 mole %, based on the total bonded butadiene. If the average content is less than 18 mole %, the surface gloss of the resulting HIPS products becomes inferior, and if more than 32 mole %, the impact strength becomes too low for practical use.

The control of the 1,2-bond content can be achieved by manipulating the species or quantity of the Lewis base in the polymerization of 1,3-butadiene or copolymerization of 1,3-butadiene with styrene.

The butadiene rubber used in the invention is featured by containing at least 60%, preferably 80% or more, by weight of the branched polymer chains resulting from the action of the multifunctional halogen compound on active chain ends of the resulting 1,3-butadiene homopolymer or copolymer. The content of 60% by weight or more gives HIPS favorable in impact strength and appearance properties and additionally results in good workability of the HIPS production. In contrast, the content less than 60% by weight give rise to objectional matters such that the viscosity of the styrene-butadiene rubber reaction mixture for HIPS production increases undesirably during polymerization and the stability and reproducibility of mechanical properties of the product HIPS is lowered.

The content of the branched polymer chains can be controlled by manipulating the amount ratio of the organolithium compound to the multifunctional halogen compound. Usually the latter is used in an amount of at least 0.6 equivalent, preferably 0.8 to 1.0 equivalent, to the former.

The butadiene rubber used in the present invention, prepared as described above and being under various restrictions, needs to exhibit a Mooney viscosity of 40 to 90 at 100° C., and when dissolved in styrene, exhibit a solution viscosity of 60 to 90 cps at 25° C. and at a concentration of 5% by weight.

When these viscosities are lower than the above lower limits, viz. the molecular weight is lower than a certain value, the impact strength of the resulting HIPS becomes undesirably low or the stability and reproducibility of physical properties thereof becomes worse. On the other hand, when these viscosities exceed the above upper limits, viz. the molecular weight is higher than a certain value, appearance properties such as surface gloss of the HIPS is deteriorated or the stirring of the polymerization mixture in the reactor for HIPS production is difficult and the uniformity of the HIPS product quality is not secured.

The butadiene rubber used in the present invention is further featured in that the styrene solution viscosity (SV) thereof at a concentration of 5% by weight, in relation to the Mooney viscosity (ML) thereof, lies nearly in the range of $0.7 \times ML \leq SV \leq 1.8 \times ML$ and hence the solution of the rubber in styrene is easy to mix.

In the present invention, a HIPS is produced by radical polymerization of styrene in the presence of the above defined butadiene rubber, where the proportions of the two components are chosen so that the butadiene rubber is contained in an amount of 3 to 20%, particularly 5 to 15%, by weight in the product HIPS. If the content of the butadiene rubber is less than 3% by weight, the HIPS has a low Izod impact strength. On the contrary, if the content exceeds 20% by weight, the HIPS exhibits a low surface gloss.

The radical polymerization of styrene herein is carried out by either of the known bulk polymerization and bulk-suspension combined polymerization methods. For instance, according to the bulk polymerization method, the butadiene rubber is dissolved in styrene, then the solution is heated at a temperature of 90° to 150° C. in the presence or absence of a catalyst to polymerize styrene, and the polymerization is continued until a prescribed amount of styrene reacts. In this case, a small amount of toluene, ethylbenzene, or the like as a diluent can be added to the reaction mixture so as to avoid such a state that an increase in the polymerization conversion causes a quick rise in the viscosity of the reaction mixture, thereby making the stirring difficult or that the reaction control becomes impossible on account of a rapid increase in the reaction rate. After polymerization, the diluent is removed together with the unreacted styrene by heating or under reduced pressure. According to the bulk-suspension combined polymerization method, the butadiene rubber is dissolved in styrene, then the solution is heated in the presence or absence of a catalyst to polymerize a part of the styrene, this partially polymerized reaction mixture is transferred into water in the presence of a suspension stabilizer or a surfactant and dispersed by stirring, the polymerization of styrene is completed by the suspension polymerization method, and polymer particles are taken out from the resultant aqueous slurry, washed, and dried to give the product HIPS.

In this polymerization of styrene, any of common radical polymerization catalysts may be used including organic peroxides such as benzoyl peroxide, di-tert-butyl peroxide, lauryl peroxide, dicumyl peroxide, etc. Of these catalysts, particularly preferred are benzoyl peroxide and di-tert-butyl peroxide. Suitable amounts of catalyst are 0.01 to 1.0 g per 100 g of styrene.

In the production process of the present invention, a part of the styrene constituting HIPS cojointly with the butadiene rubber can be replaced by another monomer copolymerizable with styrene. Examples of the monomer other than styrene are monovinyl aromatic hydrocarbons such as α-methylstyrene, p-methylstyrene, p-tert-butylstyrene, m-methylstyrene, and vinylnaphthalene, conjugated dienes such as butadiene and isoprene, and acrylonitrile and methyl methacrylate. One or more monomers selected from these compounds are used in a combined amount of up to 50% by weight based on all the monomers used including styrene.

The HIPS produced by the process of the present invention is formed by injection molding, extrusion, or other processing method and used practically as a variety of articles, wherein antioxidants, ultraviolet absorbers, lubricants, mold releasing agents, fillers, etc. can be incorporated into the HIPS before processing, unless departing from the object of the invention.

The HIPS thus produced by the process of the present invention is very worthwhile since it is improved in the balance of Izod impact strength with surface gloss, as compared with the prior art HIPS, and is quite satisfactory in the required levels of these properties for practical use in vehicles, electrical household appliances, and so forth. In particular, these two properties have been regarded as difficult to improve simultaneously according to the known processes. Accordingly, the process of the present invention brings about marked progress in the art of HIPS production.

The following examples illustrate the invention, which is, however, not limited to these examples. In the examples, parts are all by weight.

EXAMPLES 1 to 3 and Comparative Examples 1 to 5

A 10-liter autoclave equipped with a stirrer and a jacket was purged throughly with dry nitrogen gas, and charged with 7l of dry cyclohexane, 1 kg of 1,3-butadiene, and diethylene glycol dimethyl ether (varying amount). The inner temperature was raised to 55° C., and n-butyllithium (varying amount) was added to initiate polymerization. After about 150 minutes' reaction, tin tetrachloride (varying amount) was added and reacted for 30 minutes. 0.5 PHR By weight of 2,6-di-tert-butyl-4-0 methylphenol (supplied by Sumitomo Chemical Company Ltd. under the tradename of Sumilizer BHT) as antioxidant was added to the resulting polymer solution, and the solvent was distilled off by heating to give a polybutadiene.

Each 8 parts of polybutadienes prepared in the above manner was added to 92 parts of styrene and dissolved with stirring at room temperature. After addition of 0.08 part of tert-dodecyl mercaptan, the resulting catalyst-free solution was heated with stirring at 120° C. for 4 hours, whereby about 30% of the styrene was polymerized.

To 100 parts of the resulting solution were added 150 parts of water, 0.2 part of aluminium hydroxide, 0.02 part of sodium dodecylbenzenesulfonate, 0.3 part of benzoyl peroxide and 0.05 part of di-tert-butyl peroxide. The polymerization was conducted stepwise, for 4 hours at 80° C., for 3 hours at 100° C., and for 5 hours at 130° C. The polymer was filtered off from the resulting slurry, washed with water, and dried. Press sheets were prepared from the thus obtained polymers by using an extruder and a compression molding machine, to evaluate physical properties.

Izod impact strength was determined in accordance with JIS K-6871. Surface gloss was evaluated by visual observation of the surface of the press sheet, and rated according to the following 5 ranking criteria. The results are summarized in Table 1.

| Rating | Surface state |
|--------|---------------|
| 5 | Excellent; Having extremely high smoothness and a high degree of gloss like metallic luster. |
| 4 | Good; Having high smoothness and good gloss. |
| 3 | Fair; Having some degree of gloss but slightly dul. |
| 2 | Inferior; Having foggy surface; Gloss is low. |
| 1 | Very inferior; Random marks like stains are observed on the surface; Gloss is low. |

Structural analyses of polybutadiene were conducted in the following ways.

Average content of 1,2-bonds:
Determined according to infrared absorption spectroscopy.

Mooney viscosity:
Using a Mooney viscometer set to 100° C., the specimen was preheated for 1 minute, and the torque 4 minutes later was read (ML, 1+4, 100° C.).

Content of high-molecular branched chains:
The specimen was subjected to high pressure liquid chromatography at 40° C. by using a HLC system (supplied by Toyo Soda Co., Ltd. under the tradename of HLC-802UR), columns of $10^3$, $10^4$, $10^6$, and $10^7$, a refractomer as detector, and tetrahydrofuran (THF) as developing solvent. Heights of the peaks corresponding to the respective average molecular weights of branched polymer chains and linear polymer chains were determined. The relative peak heights were defined as the respective weight proportions of branched polymer chains and linear polymer chains in the specimen.

Solution viscosity:
Viscosity in styrene at a polybutadiene concentration of 5% by weight was measured by using a B-type viscometer placed in a thermostat at 25° C.

TABLE 1

|  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Conditions of polybutadiene preparation: | | | | | | | | |
| n-Butyllithium (mmole) | 8.5 | 9.1 | 8.7 | 11.0 | 17.5 | 12.0 | 7.2 | 5.0 |
| Diethylene glycol dimethyl ether (mmole) | 0.72 | 1.0 | 1.1 | 0 | 0.65 | 2.0 | 0.70 | 0.80 |
| Tin tetrachloride (mmole) | 1.4 | 2.2 | 1.9 | 2.8 | 4.2 | 8.0 | 0.5 | 0 |
| Structural characteristic values of polybutadiene: | | | | | | | | |
| Average content of 1,2-bonds (mol %) | 20 | 26 | 29 | 9 | 15 | 40 | 20 | 25 |
| Mooney viscosity (ML, 1 + 4, 100° C.) | 58 | 68 | 70 | 98 | 45 | 78 | 65 | 60 |
| Content of branched polymer chains (%) | 62 | 93 | 83 | 95 | 82 | 92 | 80 | 0 |
| Solution viscosity (cps) | 74 | 62 | 65 | 97 | 84 | 75 | 120 | 140 |
| Properties of product HIPS: | | | | | | | | |
| Izod impact strength (kg-cm/cm · notched) | 11.8 | 10.5 | 12.6 | 9.8 | 7.2 | 6.5 | 7.9 | 8.1 |
| Surface gloss | 5 | 5 | 5 | 3 | 4 | 5 | 3 | 3 |
| Remarks | — | — | — | — | — | — | — | Stirring was difficult in styrene polymerization. |

As can be seen from Table 1, columns of Examples 1 to 3, the HIPS obtained by the process of the present invention has high Izod impact strength and exhibits excellent surface gloss.

In contrast to this, the HIPS produced by using a polybutadiene in which the average content of 1,2-bonds is less than 18 mole % exhibits low surface gloss as shown in Table 1, columns of Comparative Examples 1 and 2, and therefore does not meet the object of the present invention.

In particular, a polybutadiene, like the sample of Comparative Example 1, having a value of the Mooney viscosity of over 90 and exhibiting a value of the solution viscosity of over 90 cps gives a HIPS inferior in surface gloss, while a polybutadiene, like the sample of Comparative Example 2, having a value of the solution viscosity of less than 60 cps gives a polystyrene having low impact strength.

A polybutadiene, like the sample of Comparative Example 3, in which the average content of 1,2-bonds exceeds 32 mole % give a polystyrene exhibiting high surface gloss but considerably low impact strength as compared with the HIPS (Examples 1 to 3) produced by the process of the present invention. The process using such a polybutadiene does not meet the object of the present invention.

Moreover, when a polybutadiene, like samples of Comparative Examples 4 and 5, in which the content of branched polymer chains is less than 60% by weight, is used in the polymerization of styrene, the stirring of the reaction mixture is disturbed, the polymerization becomes unstable, and additionally the product exhibits low surface gloss and insufficient impact strength, which are undesirable phenomenone.

Thus it has been indicated that a polybutadiene satisfying the following requirements, as stated before, gives a HIPS sufficiently improved in the balance between impact strength and surface gloss. That is, the average content of 1,2-bonds is from 18 to 32 mole %, preferably from 20 to 30 mole %; the content of branched polymer chains is at least 60%, preferably 80% or more, by weight; the Mooney viscosity is from 40 to 90 at 100° C.; and the solution viscosity in styrene at a concentration of 5% is from 60 to 90 cps at 25° C.

EXAMPLE 4

Using the same 10-liter autoclave as used in Examples 1 to 3, a styrene-butadiene rubber was prepared, in which the content of bonded styrene was 5% by weight, the average content of 1,2-bonds was 21 mole %, and the content of branched chains was 87% by weight, and the Mooney viscosity of the rubber was 68 and the solution viscosity thereof was 87%.

Then a solution was prepared by mixing 8 parts of said styrene-butadiene rubber, 92 parts of styrene monomer, 5 parts of ethylbenzene, and 0.5 part of 2,6-di-tert-butyl-4-methylphenol at room temperature. This solution was charged into a reactor, and the styrene was polymerized for 5 hours by raising the temperature gradually from 90° to 125° C, then for 5 hours from 125° to 160° C., and further for 2 hours from 160° to 180° C. Thereafter the unreacted monomer and ethylbenzene were distilled off by raising the temperature to 220° C. under reduced pressure. The remaining polymer was dried, ground, and pelletized through an extruder. Physical properties of the resulting HIPS were evaluated in the same manner as in Examples 1 to 3. The found Izod impact strength was 12.8 kg·cm/cm and the surface gloss was rated as 5.

COMPARATIVE EXAMPLE 6

In the same manner as in Examples 1 to 3, a HIPS was prepared by using a commercial polybutadiene in which the average content of 1,2-bonds was 18 mole %, the Mooney viscosity of which was 37, and the solution viscosity thereof was 83 cps. The Izod impact strength of this HIPS was 9.6 kg·cm/cm and the surface gloss was rated as 3.

What is claimed is:

1. In a process for producing a high impact polystyrene comprising radical polymerization of styrene in the presence of a butadiene rubber, the improvement which comprises the butadiene rubber being a highly branched polymer prepared by homopolymerizing 1,3-butadiene or copolymerizing 1,3-butadiene with styrene in the presence of an organomonolithium compound and a Lewis base compound, followed by further reacting the resulting polymer with at least one multifunctional halogen compound selected from the group consisting of silicon tetrachloride, tin tetrachloride and germanium tetrachloride; in the butadiene rubber, the average content of 1,2-bonds being 18 to 32 mole % based on the total bonded butadiene, the content of bonded styrene being up to 10% by weight, and the content of branched polymer chains being at least 60% by weight; the butadiene rubber exhibiting a Mooney viscosity of 40 to 90 at 100° C. and a solution viscosity in styrene of 60 to 90 cps at 25° C. and at a concentration of 5% by weight, and the ratio of the solution viscosity (SV) to the Mooney viscosity (ML) being $0.7 \leq SV/ML \leq 1.28$; and the styrene polymerization being carried out so that the content of the butadiene rubber in the product polystyrene lies between 3 and 20% by weight.

2. A process according to claim 1, wherein the average content of 1,2-bonds in the butadiene rubber is 20 to 30 mole % based on the total bonded butadiene.

3. A process according to claim 1, wherein the content of branched polymer chain in the butadiene rubber is 80% or more by weight.

4. A process according to claim 1, wherein 0.5 to 3 mmol of the organomonolithium compound per 100 g of the 1,3-butadiene and 0.01 to 1.00 mole of the Lewis base compound per mole of the organomonolithium compound are used in the production of the butadiene rubber.

5. A process according to claim 1, wherein the multifunctional halogen compound is used in an amount of at least 0.6 equivalent to the organolithium compound.

6. A process according to claim 1, wherein the organomonolithium compound is ethyllithium, n-butyllithium, stearyllithium, allyllithium, cyclohexyllithium, phenyllithium or benzyllithium.

7. A process according to claim 1, wherein the Lewis base compound is dibutylether, ethyleneglycol dimethyl ether, ethyleneglycol dibutyl ether, diethyleneglycol dibutyl ether, triethylamine, tributylamine, or N,N,N',N'-tetramethylethylenediamine.

8. A process according to claim 1, wherein the polymerization of 1,3-butadiene or copolymerization of 1,3-butadiene with styrene is conducted at 30° to 80° C. for 1 to 6 hours.

9. A process according to claim 1, wherein the further reaction of butadiene rubber with the multifunctional halogene compound is conducted at 30° to 80° C. for 5 minutes to 1 hour.

10. A process according to claim 1, wherein the radical polymerization of styrene in the presence of the butadiene rubber is conducted by the known bulk polymerization or bulk-suspension combined polymerization method.

11. In a process for producing a high impact polystyrene comprising radical polymerization of styrene in the presence of a butadiene rubber, the improvement which comprises the butadiene rubber being a highly branched polymer prepared by homopolymerizing 1,3-butadiene or copolymerizing 1,3-butadiene with styrene in the presence of an organomonolithium compound and a Lewis base compound, followed by further reacting the resulting polymer with silicone tetrachloride; in the butadiene rubber, the average content of 1,2-bonds being 18 to 32 mole % based on the total bonded butadiene, the content of bonded styrene being up to 10% by weight, and the content of branched polymer chains being at least 60% by weight; the butadiene rubber exhibiting a Mooney Viscosity of 40 to 90 at 100° C. and a solution viscosity in styrene of 60 to 90 cps at 25° C. and at a concentration of 5% by weight, and the ratio of the solution viscosity (SV) to the Mooney viscosity (ML) being $0.7 \leq SV/ML \leq 1.28$; and the styrene polymerization being carried out so that the content of the butadiene rubber in the product polystyrene lies between 3 and 20% by weight.

12. In a process for producing a high impact polystyrene comprising radical polymerization of styrene in the presence of a butadiene rubber, the improvement which comprises the butadiene rubber being a highly branched polymer prepared by homopolymerizing 1,3-butadiene or copolymerizing 1,3-butadiene with styrene in the presence of an organomonolithium compound and a Lewis base compound, followed by further reacting the resulting polymer with tin tetrachloride; in the butadiene rubber, the average content of 1,2-bonds being 1% to 32 mole % based on the total bonded butadiene, the content of bonded styrene being up to 10% by weight, and the content of branched polymer chains being at least 80% by weight; the butadiene rubber exhibiting a Mooney viscosity of 40 to 90 at 100° C. and a solution viscosity in styrene of 60 to 90 cps at 25° C. and at a concentration of 5% by weight, and the ratio of the solution viscosity (SV) to the Mooney viscosity (ML) being $0.7 \leq SV/ML \leq 1.28$; and the styrene polymerization being carried out so that the content of the butadiene rubber in the product polystyrene lies between 3 and 20% by weight.

13. In a process for producing a high impact polystyrene comprising radical polymerization of styrene in the presence of a butadiene rubber, the improvement which comprises the butadiene rubber being a highly branched polymer prepared by homopolymerizing 1,3-butadiene or copolymerizing 1,3-butadiene with styrene in the presence of an organomonolithium compound and a Lewis base compound, followed by further reacting the resulting polymer with germanium tetrachloride; in the butadiene rubber, the average content of 1,2-bonds being 18 to 32 mole % based on the total bonded butadiene, the content of bonded styrene being up to 10% by weight, and the content of branched polymer chains being at least 60% by weight; the butadiene rubber exhibiting a Mooney viscosity of 40 to 90 at 100° C. and a solution viscosity in styrene of 60 to 90 cps at 25° C. and at a concentration of 5% by weight, and the ratio of the solution viscosity (SV) to the Mooney viscosity (ML) being $0.7 \leq SV/ML \leq 1.28$; and the styrene polymerization being carried out so that the content of the butadiene rubber in the product polystyrene lies between 3 and 20% by weight.

* * * * *